United States Patent
Suzuki et al.

(10) Patent No.: US 11,388,048 B2
(45) Date of Patent: *Jul. 12, 2022

(54) DISPLAY INFORMATION PROCESSING APPARATUS, DISPLAY INFORMATION PROCESSING METHOD AND COMPUTER READABLE RECORDING MEDIUM

(71) Applicant: HITACHI, LTD., Tokyo (JP)

(72) Inventors: Katsunori Suzuki, Tokyo (JP); Satoshi Kaneko, Tokyo (JP); Shinichi Hayashi, Tokyo (JP); Akira Kono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,514

(22) Filed: May 24, 2021

(65) Prior Publication Data

US 2021/0288871 A1    Sep. 16, 2021

Related U.S. Application Data

(63) Continuation of application No. 17/016,620, filed on Sep. 10, 2020, now Pat. No. 11,050,614.

(30) Foreign Application Priority Data

Oct. 4, 2019  (JP) .............................. JP2019-183410

(51) Int. Cl.
    *H04L 41/0803* (2022.01)
    *G09G 5/38* (2006.01)
    *H04L 41/12* (2022.01)

(52) U.S. Cl.
    CPC .......... *H04L 41/0803* (2013.01); *G09G 5/38* (2013.01); *H04L 41/12* (2013.01); *G09G 2354/00* (2013.01)

(58) Field of Classification Search
    CPC ....... H04L 41/0803; H04L 41/12; G09G 5/38; G09G 2354/00
    See application file for complete search history.

(56) References Cited

U.S. PATENT DOCUMENTS

| 9,998,339 B1 | 6/2018 | Brajkovic et al. |
| 11,050,614 B2 * | 6/2021 | Suzuki ................ H04L 41/0806 |

(Continued)

FOREIGN PATENT DOCUMENTS

| EP | 3240231 A1 | 11/2017 |
| JP | 2016-507791 A | 3/2016 |
| WO | 2016/103421 A1 | 6/2016 |

OTHER PUBLICATIONS

K. Sugiyama, S. Tagawa and M. Toda, "Methods for visual understanding of hierarchical system structures," IEEE Transactions on Systems, Man, and Cybernetics, 11, pp. 109-125, 1981.

*Primary Examiner* — James R Sheleheda
(74) *Attorney, Agent, or Firm* — Volpe Koenig

(57) ABSTRACT

Visibility of relevance of detailed configurations is improved while deterioration of the visibility of a general configuration between nodes is suppressed. A node coordinate calculation process calculates, upon calculation of deployment coordinates of each node, a degree of importance of an infrastructure resource and a degree of importance of an application, and weights the distance between the application node and the infrastructure node with the reciprocal of the degree of importance of the infrastructure node. Then, the node coordinate calculation process determines deployment of the application node such that the application node is deployed in the proximity of a comparatively important infrastructure node, and determines deployment of the application node on the basis of the degrees of importance of the applications such that a comparatively important application is deployed closely to the infrastructure node.

13 Claims, 24 Drawing Sheets

(56) References Cited

U.S. PATENT DOCUMENTS

| | | |
|---|---|---|
| 11,070,452 B1* | 7/2021 | Roy .................... H04L 41/22 |
| 2003/0103068 A1* | 6/2003 | Longnecker ............ H04L 41/12 |
| | | 715/700 |
| 2003/0110192 A1 | 6/2003 | Valente et al. |
| 2005/0259596 A1 | 11/2005 | Sakai |
| 2006/0117038 A1 | 6/2006 | Toebes et al. |
| 2007/0097883 A1 | 5/2007 | Liu et al. |
| 2008/0049645 A1 | 2/2008 | Singh |
| 2009/0249213 A1 | 10/2009 | Murase et al. |
| 2009/0327903 A1 | 12/2009 | Smith et al. |
| 2013/0024458 A1 | 1/2013 | Morphis et al. |
| 2013/0321458 A1 | 12/2013 | Miserendino et al. |
| 2014/0201642 A1 | 7/2014 | Vicat-Blanc |
| 2015/0052441 A1 | 2/2015 | Degioanni |
| 2015/0071557 A1 | 3/2015 | Movellan et al. |
| 2015/0248119 A1 | 9/2015 | Yamasaki et al. |
| 2015/0378542 A1* | 12/2015 | Saito .................... G06F 3/0629 |
| | | 715/736 |
| 2017/0160842 A1* | 6/2017 | Shimada ................ G06F 11/328 |
| 2017/0324620 A1 | 11/2017 | Ellis et al. |
| 2018/0089299 A1 | 3/2018 | Collins et al. |
| 2018/0123903 A1 | 5/2018 | Holla et al. |
| 2018/0176261 A1 | 6/2018 | Bansal et al. |
| 2021/0248119 A1* | 8/2021 | Li .......................... G06F 3/0613 |

* cited by examiner

| APPLICATION RESOURCE ID (T2001) | APPLICATION NAME (T2002) | VM RESOURCE ID (T2003) |
|---|---|---|
| 1 | Accounting | 2 |
| | | 5 |
| 2 | Analyses | 3 |
| ... | ... | ... |

| VM RESOURCE ID | VM NAME | INSTANCE TYPE ID | SERVER RESOURCE ID | VOLUME RESOURCE ID | COUNTRY | DATA CENTER |
|---|---|---|---|---|---|---|
| 1 | VM1 | 101 | 1 | 1 | Japan | Tokyo DC |
| 2 | VM2 | 100 | 1 | 2 | Japan | Tokyo DC |
| 3 | VM3 | 101 | 2 | 3 | Japan | Tokyo DC |
| 4 | VM4 | 100 | 3 | 4 | USA | New York DC |
| 5 | VM5 | 101 | 3 | 5 | USA | New York DC |
| 6 | VM6 | 100 | 3 | 6 | USA | New York DC |
| ... | ... | ... | ... | ... | ... | ... |

FIG.6

| SERVER RESOURCE ID | SERVER NAME | FABRIC RESOURCE ID | SERVER CLUSTER | COUNTRY | DATA CENTER |
|---|---|---|---|---|---|
| 1 | Server1 | 1 | Cluster1 | Japan | Tokyo DC |
| 1 | Server2 | 1 | Cluster2 | Japan | Tokyo DC |
| 1 | Server3 | 2 | Cluster3 | USA | New York DC |
| ... | ... | ... | ... | ... | ... |

T220, T2201, T2202, T2203, T2204, T2205, T2206

F I G. 7

T230 → T2301   T2302   T2303   T2304

| FABRIC RESOURCE ID | FABRIC NAME | COUNTRY | DATA CENTER |
|---|---|---|---|
| 1 | Fabric1 | Japan | Tokyo DC |
| 2 | Fabric2 | USA | New York DC |
| ... | ... | ... | ... |

| VOLUME RESOURCE ID | VOLUME NAME | INSTANCE TYPE ID | STORAGE RESOURCE ID | COUNTRY | DATA CENTER |
|---|---|---|---|---|---|
| 1 | Volume1 | 201 | 1 | Japan | Tokyo DC |
| 2 | Volume2 | 200 | 1 | Japan | Tokyo DC |
| 3 | Volume3 | 201 | 1 | Japan | Tokyo DC |
| 4 | Volume4 | 200 | 2 | USA | New York DC |
| 5 | Volume5 | 201 | 2 | USA | New York DC |
| 6 | Volume6 | 200 | 2 | USA | New York DC |
| ... | ... | ... | ... | ... | ... |

| INSTANCE TYPE ID | INSTANCE TYPE NAME | KIND | MEMORY | CPU | DEVICE TYPE | PRICE |
|---|---|---|---|---|---|---|
| 100 | Large | VM | 16GB | 4CPU | - | 1$/h |
| 101 | Middle | VM | 8GB | 2CPU | - | 0.1$/h |
| 200 | Gold | Volume | - | - | SSD | 0.1$/GB |
| 201 | Silver | Volume | - | - | SAS | 0.01$/GB |
| ... | ... | ... | ... | ... | ... | ... |

| NODE ID | NODE NAME | RESOURCE ID | RESOURCE NAME | RESOURCE KIND | RESPONSE TIME | COUNTRY | DATA CENTER |
|---|---|---|---|---|---|---|---|
| 101 | Accounting | 1 | Accounting | Application | 40msec | - | - |
| 102 | Analyses | 2 | Analyses | Application | 30msec | - | - |
| 201 | VM1 | 1 | VM1 | VM | 30msec | Japan | Tokyo DC |
| 202 | VM2 | 2 | VM2 | VM | 40msec | Japan | Tokyo DC |
| 203 | VM3 | 3 | VM3 | VM | 20msec | Japan | Tokyo DC |
| 204 | VM4 | 4 | VM4 | VM | 10msec | USA | New York DC |
| 205 | VM5 | 5 | VM5 | VM | 10msec | USA | New York DC |
| ... | ... | ... | ... | ... | ... | ... | ... |

| CLUSTER NAME | X COORDINATE | Y COORDINATE | HEIGHT | WIDTH |
|---|---|---|---|---|
| Japan | 0 | 30 | 50 | 90 |
| USA | 100 | 30 | 50 | 100 |
| Tokyo DC | 10 | 40 | 30 | 70 |
| New York DC | 110 | 40 | 30 | 60 |
| ... | ... | ... | ... | ... |

| NODE ID | COST | DEGREE OF IMPORTANCE | COUNTRY | DATA CENTER |
|---------|------|----------------------|---------|-------------|
| 101 | 200 $/h | 100 | Japan | Tokyo DC |
|  | 50 $/h | 25 | USA | New York DC |
| 102 | 50 $/h | 25 | Japan | Tokyo DC |
| ... | ... | ... | ... | ... |

T1010
```
{
    "Nodes": [
        {
            "name": Server1,
            "rag status": r,
        }
        {
            "name": VM1,
            "rag status": r,
        },
        ...
    ],
```

T1020
```
    "links": [
        {
            "from":1,
            "to": 2,
        },
        {
            "from":1,
            "to": 2,
        }
        ...
    ]
}
```

DISPLAY INFORMATION PROCESSING APPARATUS, DISPLAY INFORMATION PROCESSING METHOD AND COMPUTER READABLE RECORDING MEDIUM

This application is a continuation of U.S. patent application Ser. No. 17/016,620, filed Sep. 10, 2020, which claims the benefit of Japanese Patent Application JP 2019-183410, filed Sep. 4, 2019, which are incorporated by reference as if fully set forth.

BACKGROUND OF THE INVENTION

1. Field of the Invention

The present invention relates to a display information processing apparatus, a display information processing method and a computer readable recording medium.

2. Description of the Related Art

In information technology (IT) system management, management operation is performed from various perspectives (performance, capacity and so forth: a perspective is hereinafter referred to also as Feature) such as coping with performance failure and capacity planning. For example, in the case where it is tried to cope with performance failure, in order to confirm a performance state of problematic infrastructure resources and prioritize a plurality of problems for coping, related application resources subjected to the influence is confirmed. In this manner, when IT system management is to be performed, both of an application resource to be made an index for measuring the importance of a problem and a system configuration of a problematic infrastructure resource are overlooked.

As described above, in order to efficiently perform management operation of the IT system, it is demanded that the entire IT system including both of an infrastructure resource and an application resource can be easily overlooked and grasped while the perspective is suitably switched. For such a request as just described, a technology is available in which a relation among resources configuring the IT system is displayed topologically.

For example, in JP-2016-565776-A, a technology is disclosed in which, in regard to an IT system constructed on a cloud environment, configuration information on resources configuring the IT system and group units (virtual DCs, virtual servers, a security group and so forth) on management are collected, and a system configuration diagram is visualized on the basis of the configuration information.

Further, the SUGIYAMA Framework disclosed in "K. Sugiyama, S. Tagawa and M. Toda, "Methods for visual understanding of hierarchical system structures," IEEE Transactions on Systems, Man, and Cybernetics, 11, pp. 109-125, 1981" is known as a graph drawing algorithm for displaying components and a relationship of the components. In the SUGIYAMA framework, a coordinate of a node can be calculated efficiently in regard to such a graph that a Y coordinate on a screen image is fixed for each kind of nodes. Components of the IT system and a relationship of the components can be displayed using the SUGIYAMA framework.

Further, in JP-2015-529728-A, a technology is disclosed in which, considering that, when a large-scale IT system is displayed topologically, a great number of nodes are involved and this degrades the visibility, a node is displayed appropriately in response to the degree of zoom in the case where a user performs zoom operation.

SUMMARY OF THE INVENTION

However, in management of such a large-scale IT system environment as has hubs all over the world, if infrastructure resources are grouped with a geographical element and displayed on a topology, then a coordinate on a screen image at which infrastructure nodes are to be disposed is limited. In the graph drawing algorithm such as the SUGIYAMA Framework, since node deployment is adjusted in order to minimize the length of a link between nodes and the number of crossing points, the possibility that such node deployment may fall into local solution increases.

Consequently, in the case where a certain application utilizes a plurality of virtual machines (a virtual machine is hereinafter referred to also as a VM), a case occurs in which the VM nodes are deployed at places spaced from each other on a screen image. In this case, it sometimes occurs that, for example, intending to minimize the total distance of links between application nodes and VM nodes, an application node is deployed at a place spaced away from all VM nodes.

If an application node and a VM node related to the application node are deployed at places spaced away from each other on a screen image in this manner, then they zoom out, and both of the application node and VM node cannot be displayed on a screen image at the same time if the entire IT system is not placed into a displayed state. In the state in which the entire IT system is displayed, the amount of information displayed on one screen image is great, and therefore, a detailed configuration of a problematic location cannot be grasped. On the other hand, if an application node and a related VM node are zoomed in in a mutually spaced state in order to make it possible to grasp a detailed configuration of a problematic location, then the application nodes and the VM nodes cannot be displayed on one screen image at the same time.

The present invention has been made in view of such a situation as described above, and it is an object of the present invention to provide a display information processing apparatus, a display information processing method and a computer readable recording medium by which the visibility of relevance in detailed configuration can be improved while degradation of the visibility of the entire configuration between nodes is suppressed.

In order to attain the object described above, a display information processing apparatus according to a first aspect of the present invention sets an index relating to relevancy between entities to which nodes configuring a topology are allocated; calculates a distance between the nodes on the basis of the index; and sets a display position of each of the nodes on the basis of the distance between the nodes.

With present invention, the visibility of a relation of detailed configurations can be improved while degradation of the visibility of the entire configuration between nodes is suppressed.

BRIEF DESCRIPTION OF THE DRAWINGS

FIG. 4 is a diagram depicting an example of a configuration of an application configuration management table of FIG. 3;

FIG. 6 is a diagram depicting an example of a configuration of a server configuration management table of FIG. 3;

FIG. 7 is a diagram depicting an example of a configuration of a fabric configuration management table of FIG. 3;

FIG. 8 is a diagram depicting an example of a configuration of a volume management table of FIG. 3;

FIG. 10 is a diagram depicting an example of a configuration of a catalog management table of FIG. 3;

FIG. 11 is a diagram depicting an example of a configuration of a node data management table of FIG. 3;

FIG. 13 is a diagram depicting an example of a configuration of a geographic cluster deployment information management table of FIG. 3;

FIG. 16 is a diagram depicting an example of a configuration of an application importance degree management table of FIG. 3;

FIG. 18 is a view depicting an example of a configuration of topology data of FIG. 3;

DESCRIPTION OF THE PREFERRED EMBODIMENTS

Embodiment 1

Embodiments are described with reference to the drawings. It is to be noted that the embodiments described below do not restrict the invention according to the claims, and components and all of combinations of the components described in the description of the embodiments are not necessarily essential as solving means of the invention.

It is to be noted that, although, in the following description, various kinds of information are described using a representation of an "aaa table," various kinds of information may otherwise be represented using a data structure other than a table. In order to indicate that information does not depend upon a data structure, an "aaa table" can be referred to as "aaa information." Further, each of information elements configured from values in columns in a table is referred to as a field or entry, and an entry of "aaa table" is referred to as an "aaa table entry" for the convenience of description.

Further, while a process in the following description is sometimes described simply taking a management computer or a server as the subject, such processes are executed by a processor (for example, a central processing unit (CPU)) of a control device provided in a computer.

Figure 1:
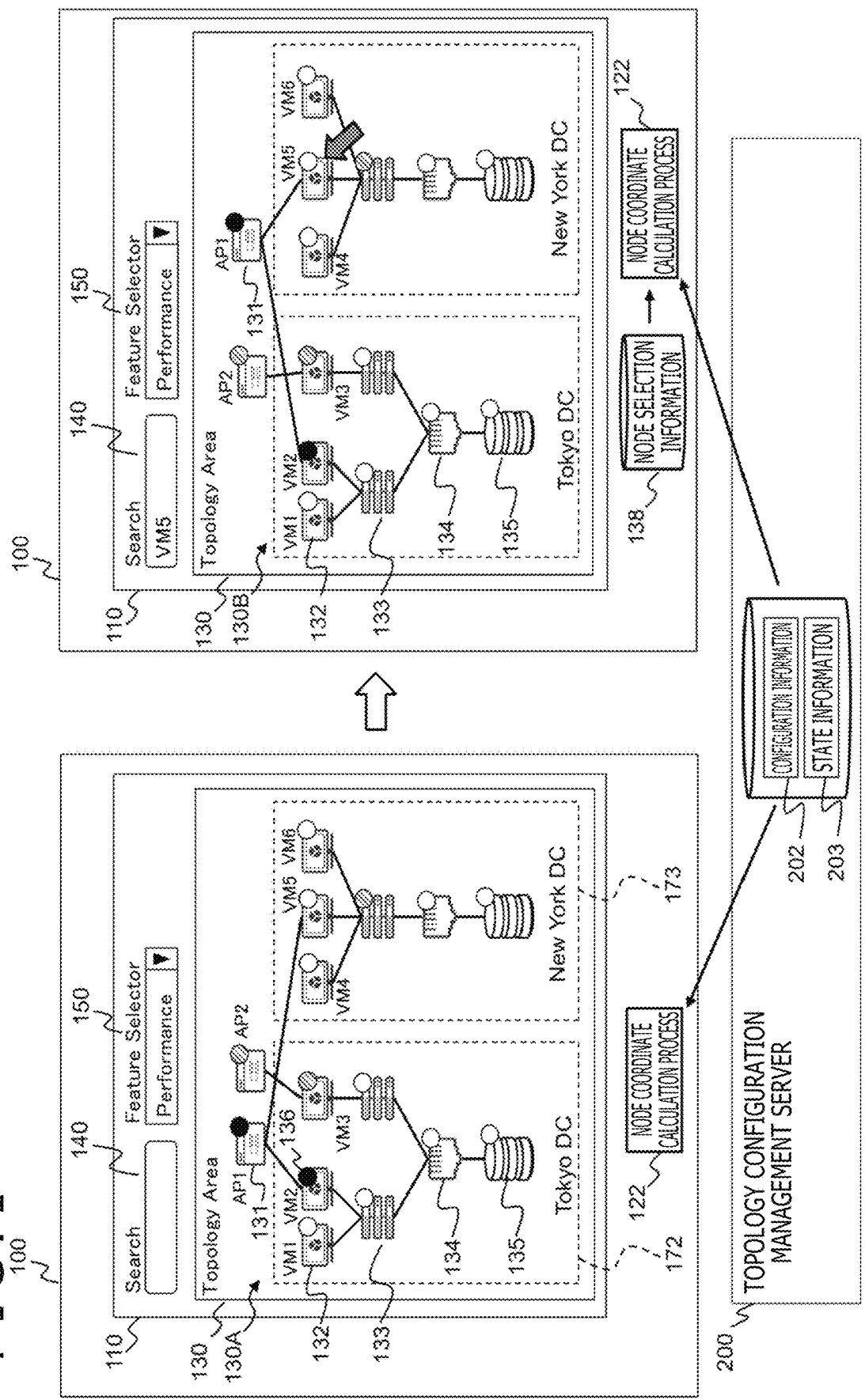
FIG. 1 is a diagram depicting an example of a display screen image controlled by a display information processing apparatus according to a first embodiment.

FIG. 1 is a diagram depicting an example of a display screen image controlled by a display information processing apparatus according to a first embodiment.

Referring to FIG. 1, a display information processing system includes a client 100 and a topology configuration management server 200. The client 100 is a terminal such as, for example, a personal computer.

The topology configuration management server 200 retains configuration information 202 about resource groups and applications that configure an IT system, and state information 203 about a performance or the like, and manages a topology configuration. Then, the topology configuration management server 200 transmits topology data to the client 100 in accordance with a request from the client 100. A topology is a connection scheme modeled using points (referred to also as nodes) and lines (referred to also as edges or links).

The client 100 displays a graphical user interface (GUI) 110. Here, the client 100 sets an index regarding relevance between entities to which nodes configuring a topology are allocated and calculates the distance between the nodes on the basis of the index. Then, the client 100 sets display positions of the nodes on the basis of the distance between the nodes. The entities are, for example, infrastructure resources and applications used in an IT system. At least part of the infrastructure resources may be in a virtualized form. At this time, the client 100 may convert each node configuring the topology into a symbol or an icon to be displayed. Each node may be selectable by a click of a user.

Further, the index regarding relevance between entities can be set so as to reflect a magnitude of the relevance between the entities. At this time, the client 100 can apply such display that, when the relevance between the entities is great, the length of a link by which nodes allocated to the entities are connected to each other is made small such that the nodes are displayed closely to each other, but when the relevance between the entities is small, the length of a link by which nodes allocated to the entities are connected to each other is made great such that the nodes are displayed so as to be spaced away from each other. Further, when a first node to which a first entity is allocated and a second node to which a second entity is allocated are connected to each other, an index regarding relevance of the second entity to the first entity can be set on the basis of the importance degree of the second entity as viewed from the first entity.

The GUI 110 includes a topology displaying portion 130, a search box 140 and a Feature selector 150. The topology displaying portion 130 displays a topology map that represents relevance of infrastructure resources and applications configuring the IT system. The infrastructure resources configuring the IT system include, for example, a VM, a server, a fabric and a storage. At this time, in the topology map, application nodes 131, VM nodes 132, server nodes 133, fabric nodes 134, storage nodes 135 and links between the nodes.

Further, in the topology map, for example, nodes may be deployed at a same height (Y coordinate) of a screen image for each kind of resources. At this time, the nodes may be represented by symbols different from each other among different kinds of resources. Further, the nodes are spaced from each other by a fixed distance or more in terms of both of X and Y coordinates such that the nodes may not unnecessarily crowd. The nodes represent particular resources, and there is no duplicate. Therefore, the topology map is represented in the form of a many-to-many graph.

The search box 140 is used to receive an input of a node name to select a node. The Feature selector 150 selects a perspective when the user confirms a state of a resource in relation to work contents or a purpose such as "Performance" or "Capacity."

At each node, a marker 136 indicative of a state of a resource is displayed. The marker 136 displays a state of a resource in the perspective selected by the Feature selector 150. For example, FIG. 1 depicts an example of a case in which the value of "Performance" is set to the Feature selector 150 in order to confirm a performance state of an application at present. At this time, the GUI 110 can represent a state in which an index for measuring a performance, for example, response time, exceeds an abnormality decision threshold value by a black circle, another state in which the response time exceeds a warning threshold value by a circle with slanting lines and a normal state by a white circle. States of such three stages are hereinafter referred to as RAG, which is an abbreviation of a set of the states of Red, Amber and Green. It is to be noted that the representation format is exemplary, and the GUI 110 may apply such a color as red, yellow or green in response to a state of a resource.

If the user accesses the client 100, then the GUI 110 displays an initial screen image 130A, which indicates an initial state of a topology map, in the topology displaying portion 130. At this time, the client 100 executes a node coordinate calculation process 122. The node coordinate calculation process 122 calculates, on the basis of an index regarding relevance between entities to which nodes configuring the topology are to be allocated, distances between the nodes, and sets display coordinates of the nodes to be displayed on the initial screen image 130A on the basis of the distances between the nodes.

For example, the node coordinate calculation process 122 estimates, on the basis of states of the infrastructure resources and costs applied to the infrastructure resources, an infrastructure resource in which different applications are confirmed simultaneously with high possibility and sets display coordinates of the nodes such that the applications are deployed comparatively closely to the concerned infrastructure resource.

In the example of FIG. 1, the topology map displays nodes of infrastructure resources that are grouped in units of geographic clusters of Tokyo data center and New York data center and displays nodes of applications related to the infrastructure resources such that they are connected to each other. Here, in the Tokyo data center, for example, three VM nodes 132 having VM names of VM1 to VM3 are displayed in the highest hierarchy, and in the New York data center, for example, three VM nodes 132 having VM names of VM4 to VM6 are displayed in the highest hierarchy. The six VM nodes 132 having the VM names of VM1 to VM6 are deployed side by side along the X axis with the Y coordinates thereof adjusted to the highest position in frames indicative of the Tokyo data center and the New York data center.

Further, it is assumed that, to an application having an application name of AP1, a VM whose VM name is VM1 and another VM whose VM name is VM5 are allocated, and to an application whose application name is AP2, a VM whose VM name is VM3 is allocated. At this time, in this topology map, the application node 131 whose application name is AP1 is connected to the VM node 132 whose VM name is VM1 and the VM node 132 whose VM name is VM5, and the application node 131 whose application name is AP2 is connected to the VM node 132 whose VM name is VM3.

Further, to each of the VM nodes 132 whose VM names are VM1 and VM4 to VM6, a marker 136 represented by a white circle indicating a state in which the response time is normal is applied; to the VM node 132 whose VM name is VM3, a marker 136 represented by a circle with slanting lines indicating that the response time exceeds the warning threshold value is applied; and to the VM node 132 whose VM name is VM2, a marker 136 represented by a black circle indicative of a state in which the response time exceeds the abnormality decision threshold value is applied.

In this case, in order to decide whether or not the priority degree of the VM that is in the Tokyo data center and whose VM name is VM2 is to be increased for later processing, the user will check an application relating to the VM. Therefore, the user will try to confirm, together with the application, the VM that is in the Tokyo data center and has the VM name of VM2 with a higher degree of possibility than the VM that is in the New York data center, has the VM name of VM5 and does not suffer from any failure.

Here, the node coordinate calculation process 122 estimates, based on the response time of the VMs, a VM whose possibility that applications may be confirmed simultaneously is high and sets display coordinates of nodes such that the applications are deployed comparatively closely to the VM. For example, the node coordinate calculation process 122 deploys the application node 131 of the application, which relates to the VMs whose VM name is VM2 and VM5 and has the application name of AP1, closely to the VM node 132 whose VM name is VM2.

This makes it possible for the user to confirm, in regard to the Tokyo data center and the New York data center, a VM having some abnormality on one screen image. Further, even in the case where the user performs a zoom-in operation in order to particularly confirm relevance between the abnormal VM and an application, the GUI 110 can display the abnormal VM and an application related to the VM as they are while they remain included in the one screen image.

Further, if the user selects a VM node 132, then the GUI 110 displays a changed screen image 130B, in which the position of an application node 131 of the topology map is changed in response to a result of the selection, on the topology displaying portion 130. The selection method of a node may be, for example, a click operation with a mouse or may be an input of a node name to the search box 140.

For example, in such a case that, although there is no abnormality in the present circumstances, there is a node located in the proximity of a resource that suffers from some abnormality, the user sometimes designates a particular node to confirm a state and a configuration. In this case, in the case where some abnormality should occur on an infrastructure resource, the user will act to confirm an application on which the abnormality has an influence.

Therefore, the node coordinate calculation process 122 re-calculates the importance degree of infrastructure resources as viewed from each application by taking also the selection condition of a node by the user into account and changes the deployment of the application nodes. For example, it is assumed that the user pays attention to the VM whose VM name is VM5 and inputs the VM name of VM5 to the search box 140. At this time, the node coordinate calculation process 122 calculates the distance between the nodes on the basis of node selection information 138 and sets the display coordinates of the nodes to be displayed on the changed screen image 130B on the basis of the distance between the nodes. The GUI 110 displays the application node 131 of the application, which relates to the VM whose VM name is VM5 and has the application name of AP1, closely to the VM node 132 whose VM name is VM5.

This makes it possible for the user to confirm a VM that relates to an application relating to a VM having some abnormality and is free from abnormality on one screen image in regard to the Tokyo data center and the New York data center. Further, even in the case where the user performs a zoom-in operation in order to particularly confirm relevance between the application and a VM having no abnormality, the GUI 110 can display the application and the VM having no abnormality while they remain included in the one screen image.

Figure 2:
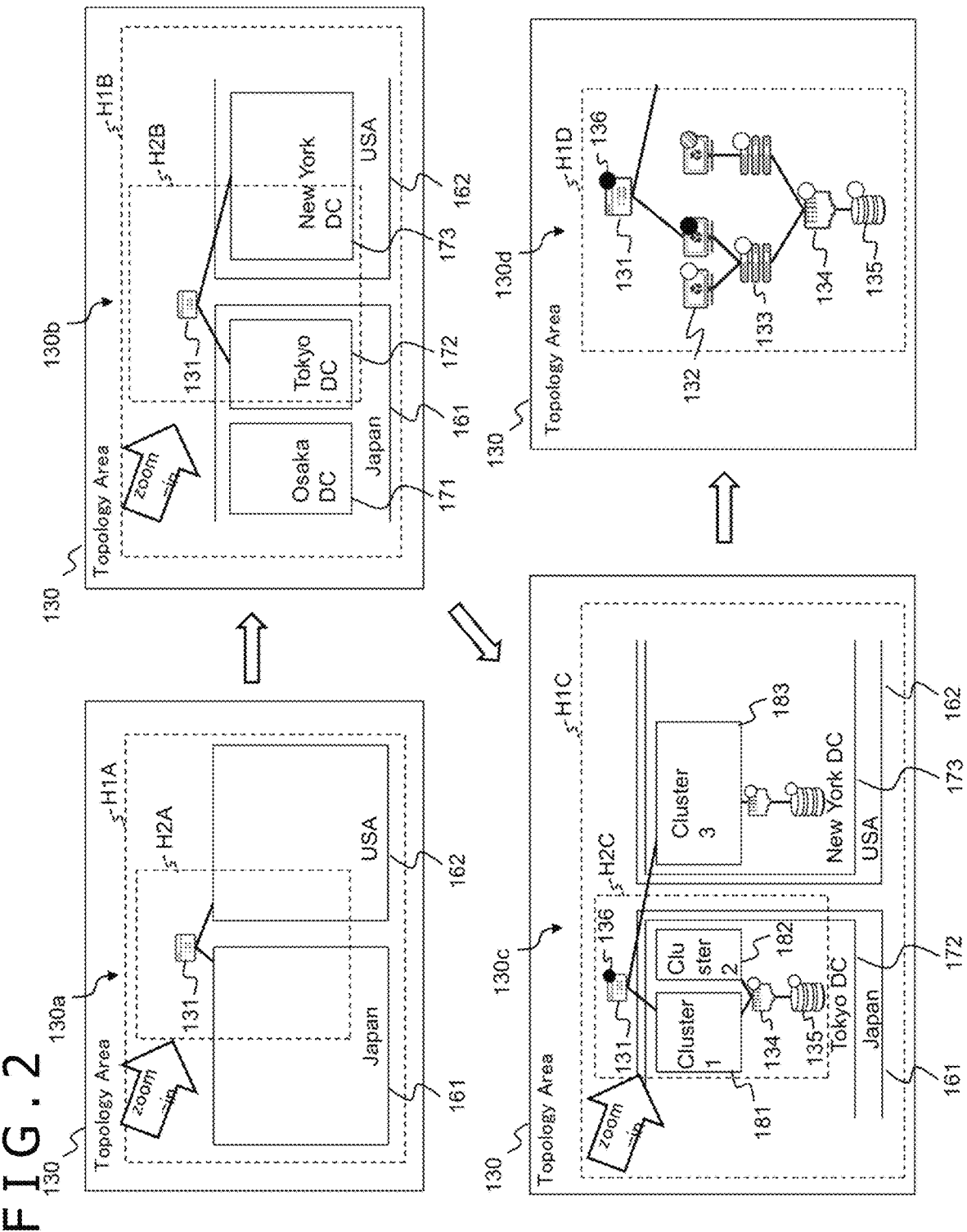
FIG. 2 is a diagram depicting an example of screen image transition upon zoom operation of a display screen image according to the first embodiment.

FIG. 2 is a view depicting an example of screen image transition at the time of a zoom operation of a display screen image according to the first embodiment.

Referring to FIG. 2, the client 100 of FIG. 1 retains a topology map indicative of a configuration of an entire IT system and displays part of the topology map on a topology displaying portion 130.

If a user accesses a GUI 110, then the GUI 110 displays a display screen image 130*a* on the topology displaying portion 130. In the display screen image 130*a*, the entire IT system that is an initial state of the topology map is displayed. At this time, an infrastructure resource node group is clustered in a unit of a country, and on the topology map, rectangles indicative of countries (each of rectangles in which nodes are put together in geographic units such as countries is hereinafter referred to as a geographic cluster, or each unit in which nodes are put together is hereinafter referred to as an xx cluster (example: country cluster) are displayed.

In the example of FIG. 2, country clusters 161 and 162 in which nodes are put together in a unit of Japan and a unit of USA are displayed in a display range H1A, and an application node 131 related to the country clusters 161 and 162 is displayed.

In order to allow a more detailed infrastructure configuration to be displayed, the user can zoom in (expand) the topology map centered on a designated location, for example, by an upward or downward scrolling operation by a mouse or by a pitch-in operation by a touch operation. Consequently, the width and the height of the display range with respect to the entire topology map decrease, and the GUI 110 displays the display range in accordance with an adjusted scale on the topology displaying portion 130 thereby to increase the size of the node or the link on the screen image. Further, the user can change the display range, for example, by a grid operation by a mouse.

It is assumed that, on the display screen image 130*a*, the user performs a zoom-in operation in regard to a display range H2A to expand part of the topology map. At this time, the GUI 110 displays a display screen image 130*b* on the topology displaying portion 130. Here, if the user begins to perform a zoom-in operation from the state in which the country clusters 161 and 162 are displayed, then at a timing at which an optional zoom degree (hereinafter referred to as a zoom rate) is reached, data center clusters are displayed in the country clusters 161 and 162. In the example of FIG. 2, in the country cluster 161, a DC cluster 171 in which nodes are put together in a unit of an Osaka data center and a DC cluster 172 in which nodes are put together in a unit of a Tokyo data center are displayed in a display range H1B. Meanwhile, in the country cluster 162, a DC cluster 173 in which nodes are put together in a unit of a New York data center is displayed in the display range H1B. Further, the application node 131 that relates to the DC clusters 172 and 173 is displayed.

It is assumed that, in the display screen image 130*b*, the user performs a zoom-in operation in regard to a display range H2B to expand part of the topology map. At this time, the GUI 110 displays a display screen image 130*c* on the topology displaying portion 130. In the example of FIG. 2, in the DC cluster 172, server clusters 181 and 182 in which server nodes and VM nodes are put together, a fabric node 134 connected to the server clusters 181 and 182 and a storage node 135 connected to the fabric node 134 are displayed in a display range H1C. Further, in the DC cluster 173, a server cluster 183 in which server nodes and VM nodes are put together, a fabric node 134 connected to the server cluster 183 and a storage node 135 connected to the fabric node 134 are displayed in the display range H1C. Further, the application node 131 that relates to the server clusters 181 and 183 is displayed.

It is assumed that, on the display screen image 130*c*, the user performs a zoom-in operation in regard to a display range H2C to expand part of the topology map. At this time, the GUI 110 displays a display screen image 130*d* on the topology displaying portion 130. In the example of FIG. 2, the application node 131, a VM node 132 included in the DC cluster 172, a server node 133, a fabric node 134 and a storage node 135 are displayed in a display range H1D, and the application node 131 connected to the VM node 132 is displayed in the display range H1D.

It is to be noted that, although the display screen images 130*a* to 130*d* exemplify a case in which a unit of a geographic cluster is used for display, a unit other than a country cluster and a DC cluster may be used for display. For example, a city may be included as a unit lower than a country. Further, the zoom rates when graphical clusters are displayed need not be fixed among the graphical clusters. For example, in the case where a country that includes a comparatively small number of data centers or server clusters and a country that includes a comparatively great number of data centers or server clusters are available, since the complicatedness in configuration is lower in the former than in the latter, the client 100 may display nodes and links in a stage in which the zoom rate is lower.

Figure 3:
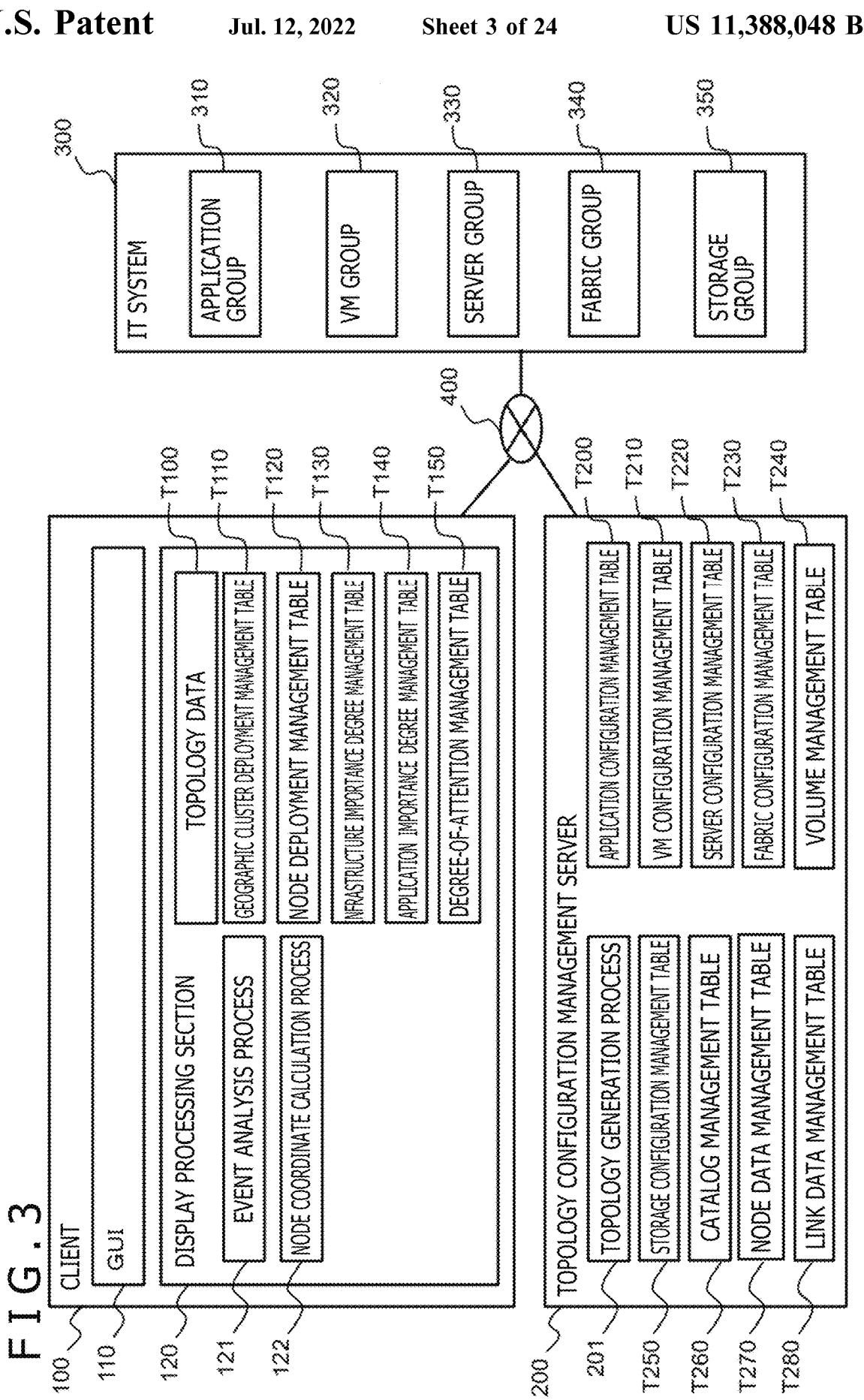
FIG. 3 is a block diagram depicting a configuration of a system to which the display information processing apparatus according to the first embodiment is applied.

FIG. 3 is a block diagram depicting a configuration of a computer system to which an information processing apparatus according to the first embodiment is applied.

Referring to FIG. 3, the computer system includes a client 100, a topology configuration management server 200 and an IT system 300. The IT system 300 includes a management target resource group that is a resource group to be displayed on a topology map. The resource group includes, for example, an application group 310, a VM group 320, a server group 330, a fabric group 340 and a storage group 350. The IT system 300 is a data center group that is managed, for example, in a certain enterprise. Such data center groups may be distributed to countries in the world.

The client 100, topology configuration management server 200 and IT system 300 communicate with each other through a network 400. Each of such servers and tools operates on a computer configured from a CPU, a memory, a hard disk and so forth. As the operating form in this case, the servers and the tools may operate on computers that are physically different from one another or may operate on a unit of computers each called virtual server that are logical divisions of a physical computer. Otherwise, servers and tools may operate in a unit of a task (also called process or container) executed on a single computer or a plurality of computer clusters.

The client 100 includes a GUI 110 for displaying hierarchized topology maps, various set value inputting selectors and so forth, and a display processing unit 120 for performing processing for displaying a topology map on the GUI 110. The client 100 may be a Web application that operates on a web browser or may be an independent desktop application.

The display processing unit 120 executes an event analysis process 121 and a node coordinate calculation process 122 and includes various tables that retain data to be used in the processes. The event analysis process 121 updates a degree of attention of a node in response to a node selection operation of the user. The node coordinate calculation process 122 calculates coordinates of an infrastructure resource and an application node.

At this time, the node coordinate calculation process 122 calculates, upon calculation of deployment coordinates of each node, for example, a degree of importance of an infrastructure resource (hereinafter referred to sometimes as a degree of infrastructure importance) and a degree of importance of an application (hereinafter referred to sometimes as a degree of application importance). Then, the node coordinate calculation process 122 weights the distance between the application node and the infrastructure node with the reciprocal of the degree of importance of the infrastructure node and determines deployment of the application node such that the application node is deployed in the proximity of a comparatively important infrastructure node. Further, the node coordinate calculation process 122 determines deployment of the application node on the basis of the degrees of importance of the applications such that a comparatively important application is deployed closely to the infrastructure node.

At this time, for example, the degree of importance of an infrastructure node is calculated on the basis of a state and a cost of the infrastructure node for each application, and the degree of importance of an application is calculated from a total value of the cost of infrastructure nodes to which the application is related. Consequently, even in the case where the resource number increases, the user can overlook and grasp the state of the entire IT system easily while successively changing the perspective and the noticed resource.

The topology configuration management server 200 executes a topology generation process 201 and includes various tables that retain configuration information about the IT system 300 and configuration information about the topology map. The topology configuration management server 200 collects configuration information about the IT system 300 to generate topology data and transmits topology data in response to a request of the client 100.

FIG. 4 is a view depicting an example of a configuration of an application configuration management table of FIG. 3.

Referring to FIG. 4, the application configuration management table T200 retains a relation between basic information about applications and infrastructure resources.

The application configuration management table T200 includes information of an application resource ID T2001, an application name T2002 and a VM resource ID T2003. The application resource ID T2001 is an ID for identifying an application. Here, the application is a unit in which a certain service is provided to an end user such as a business department and is, for example, a system that provides accounting business processing. The substance of the application may utilize a container technology or may be configured from a function as a service (FaaS) or the like. The VM resource ID T2003 is an ID of a VM resource relating to the application.

The application configuration management table T200 indicates relevance between the application node 131 and the VM node 132 displayed by the GUI 110 of FIG. 1. In the example of FIG. 4, it is indicated that VMs having VM resource IDs of 2 and 5 are allocated to an application whose application resource ID is 1, and a VM having a VM resource ID of 3 is allocated to an application whose application resource ID is 2. In accordance with the relationship, a topology map is generated in which the application node of AP1 of FIG. 1 is connected to the VM nodes of VM2 and VM5 and the application node of AP2 is connected to the VM node of VM3.

Figure 5:
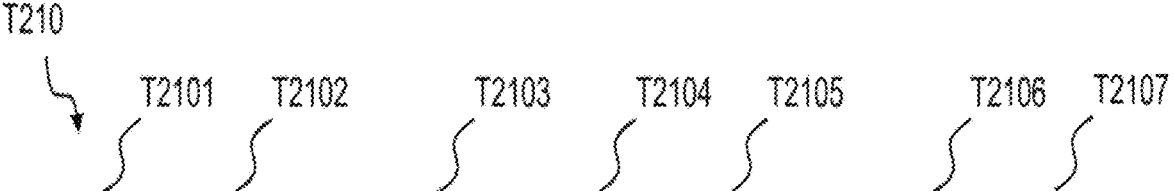
FIG. 5 is a diagram depicting an example of a configuration of a VM configuration management table of FIG. 3.

FIG. 5 is a view depicting an example of a configuration of a VM configuration management table of FIG. 3.

Referring to FIG. 5, the VM configuration management table T210 retains a relation between basic information about VMs and various infrastructure resources.

The VM configuration management table T210 includes information of a VM resource ID T2101, a VM name T2102, an instance type ID T2103, a server resource ID T2104, a volume resource ID T2105, a country T2106 and a data center T2107. The VM resource ID T2101 is an ID for identifying a VM. The instance type ID T2103 is an identification ID of an instance type indicative of a specification and a price of the VM. The server resource ID T2104 is an ID for identifying a server resource on which the VM operates. The volume resource ID T2105 is an ID for identifying a storage volume allocated to the VM. The country T2106 and the data center T2107 are a country name and a center name in which the VM runs.

The VM configuration management table T210 indicates relevance between the VM node 132 and the server node 133 displayed on the GUI 110 of FIG. 1. Further, the VM configuration management table T210 indicates also to which geographic cluster the VM node 132 and the server node 133 belong. In the example of FIG. 5, for example, the VM nodes 132 of VM1 to VM3 of FIG. 1 are deployed to the DC cluster 172, and the VM nodes 132 of VM4 to VM6 are deployed to the DC cluster 173.

FIG. 6 is a view depicting an example of a configuration of a server configuration management table of FIG. 3.

Referring to FIG. 6, the server configuration management table T220 retains a relation between basic information about servers and various infrastructure resources.

The server configuration management table T220 includes information of a server resource ID T2201, a server name T2202, a fabric resource ID T2203, a server cluster T2204, a country T2205 and a data center T2206. The server resource ID T2201 is an ID for identifying a server. The fabric resource ID T2203 is an ID for identifying a storage area network (SAN) fabric to which the server is connected. The server cluster T2204 is a name of a server cluster to which the server belongs, and the country T2205 and the data center T2206 are a country name and a data center name in which the server runs, respectively.

The server configuration management table T220 indicates relevance between the server node 133 and the fabric node 134 displayed on the GUI 110 of FIG. 1. Further, the server configuration management table T220 indicates also to which geographic cluster the server node 133 belongs.

FIG. 7 is a view depicting an example of a configuration of a fabric configuration management table of FIG. 3.

Referring to FIG. 7, the fabric configuration management table T230 retains a relation between basic information about SAN fabrics and various infrastructure resources.

The fabric configuration management table T230 includes information of a fabric resource ID T2301, a fabric name T2302, a country T2303 and a data center T2304. The fabric resource ID T2301 is an ID for identifying an SAN fabric. The country T2303 and the data center T2304 are a country name and a data center name in which the SAN fabric runs, respectively. The fabric configuration management table T230 indicates also to which geographic cluster the VM node 134 belongs.

FIG. 8 is a view depicting an example of a configuration of a volume management table of FIG. 3.

Referring to FIG. 8, the volume management table T240 retains a relation between basic information about storage volumes and various infrastructure resources.

The volume management table T240 includes information of a volume resource ID T2401, a volume name T2402, an instance type ID T2403, a storage resource ID T2404, a country T2405 and a data center T2406. The volume resource ID T2401 is an ID for identifying a storage volume. The instance type ID T2403 is an identification ID of an instance type indicative of a specification or a price of the storage volume. The storage resource ID T2404 is an ID for identifying a storage device to which the storage volume belongs. The country T2405 and the data center T2406 are a country name and a data center name in which the storage volume runs, respectively.

The volume management table T240 indicates a volume relating to the storage node 135 displayed on the GUI 110 of FIG. 1. Further, the volume management table T240 indicates also to which geographic cluster the volume relating to the storage node 135 belongs.

Figure 9:
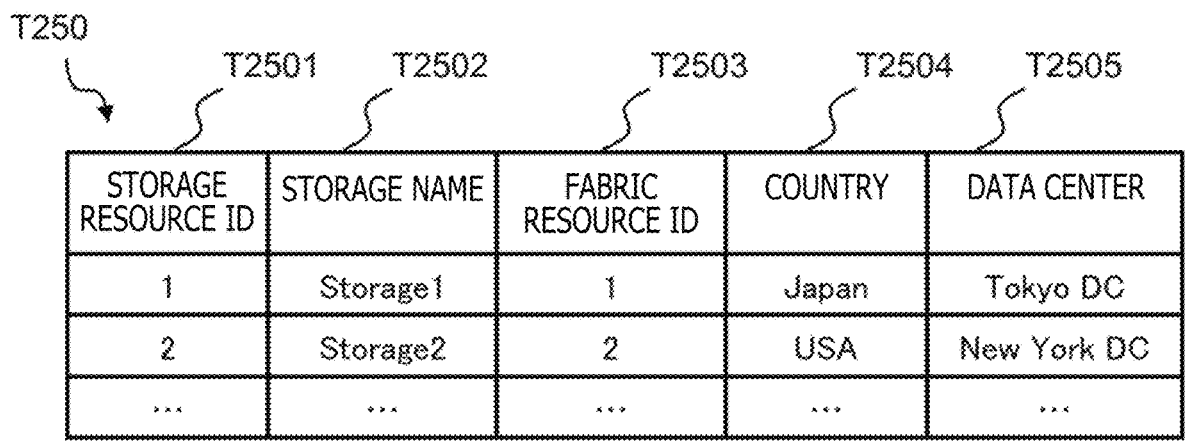
FIG. 9 is a diagram depicting an example of a configuration of a storage configuration management table of FIG. 3.

FIG. 9 is a view depicting an example of a configuration of a storage configuration management table of FIG. 3.

Referring to FIG. 9, the storage configuration management table T250 retains a relation between basic information about storage apparatus and various infrastructure resources.

The storage configuration management table T250 includes information of a storage resource ID T2501, a storage name T2502, a fabric resource ID T2503, a country T2504 and a data center T2505. The storage resource ID T2501 is an ID for identifying a storage device. The fabric resource ID T2503 is an ID for identifying an SAN fabric to which the storage device is connected. The country T2405 and the data center T2406 are a country name and a data center name in which the storage apparatus runs, respectively.

The storage configuration management table T250 indicates a relation between the storage node 135 and the fabric node 134 displayed on the GUI 110 of FIG. 1. Further, the storage configuration management table T250 indicates also to which geographic cluster the storage node 135 belongs.

FIG. 10 is a view depicting an example of a configuration of a catalog management table of FIG. 3.

Referring to FIG. 10, the catalog management table T260 retains a specification and a price for the specification in regard to VMs and storage volumes.

The catalog management table T260 includes information of an instance type ID T2601, an instance type name T2602, a kind T2603, a memory T2604, a CPU T2605, a device type T2606 and a price T2607. The instance type ID T2601 is an ID for identifying an instance type indicative of a specification and a price of a VM and a storage volume. The kind T2603 indicates a kind of an instance type such as a VM or a storage volume. The memory T2604 and the CPU T2605 are columns of fields for retaining a specification of the VM, and the device type T2606 is a column of fields for retaining a specification of the storage volume. The price T2607 is a price for each specification.

The information managed by the catalog management table T260 can be used for calculation of the degree of importance of an infrastructure resource, and the degree of importance of an infrastructure resource can be used for calculation of the distance between an application node and an infrastructure resource node displayed on the GUI 110 of FIG. 1.

FIG. 11 is a view depicting an example of a configuration of a node data management table of FIG. 3.

Referring to FIG. 11, the node data management table T270 retains basic information about nodes of topology data and state information about various resources such as a performance.

The node data management table T270 includes information of a node ID T2701, a node name T2702, a resource ID T2703, a resource name T2704, a resource kind T2705, a response time T2706, a country T2707 and a data center T2708. The node ID T2701 is an ID for identifying a node of the topology map and is a value unique in the node data management table T270. In the resource kind T2705, a value indicative of a kind of a resource is placed, and in the resource ID T2703, resource name T2704, country T2707 and data center T2708, corresponding data stored in the configuration management tables T200 to T250 corresponding to the resource kind T2705 are placed. The response time T2706 has stored therein response time when each resource performs storage access. It is to be noted that, in the case where a certain resource retains a plurality of volumes or storage access routes, the worst value is stored.

The information managed by the node data management table T270 can be used for generation of a node to be displayed on the GUI 110 of FIG. 1. Further, the information managed by the node data management table T270 can be used for calculation of the degree of importance of an infrastructure resource, and the degree of an infrastructure resource may be used for calculation of the distance between an application node and an infrastructure resource node to be displayed on the GUI 110 of FIG. 1.

Figure 12:
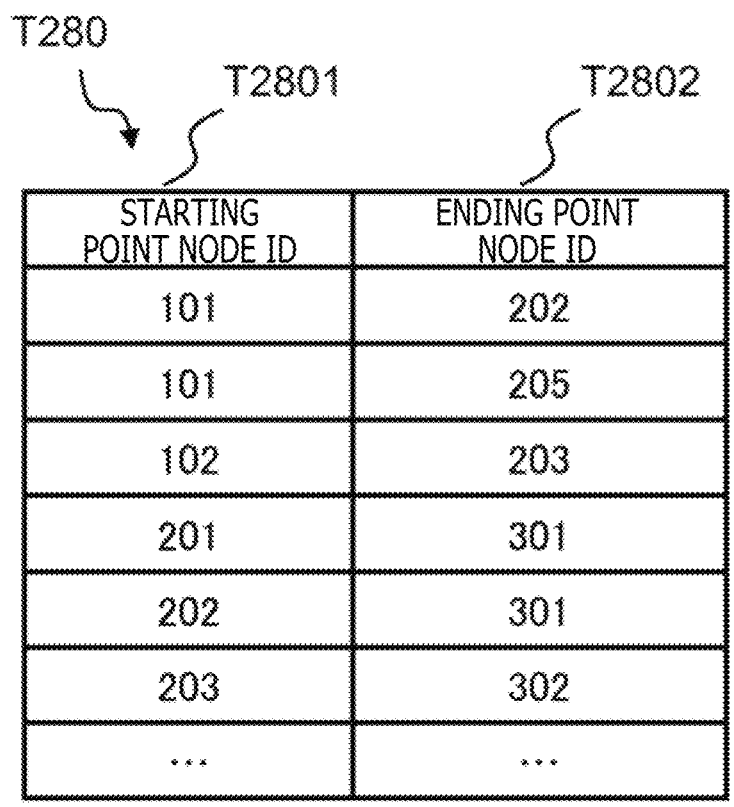
FIG. 12 is a diagram depicting an example of a configuration of a link data management table of FIG. 3.

FIG. 12 is a view depicting an example of a link data management table of FIG. 3.

Referring to FIG. 12, the link data management table T280 retains information about each link between nodes of the topology map. The link data management table T280 retains a column T2801 for retaining an ID of a starting point node of a link and a column T2802 for retaining of an ID of an ending point node.

The information managed by the link data management table T280 can be used for generation of a link to be displayed on the GUI 110 of FIG. 1. For example, the GUI 110 connects the application node of AP1 and the VM node of VM2 to each other in accordance with the information that the starting point node ID is 101 and the ending point node ID is 202; connects the application node of AP1 and the VM node of VM5 to each other in accordance with the information that the starting point node ID is 101 and the ending node ID is 205; and connects the application node of AP2 and the VM node of VM3 to each other in accordance with the information that the starting point node ID is 102 and the ending point node ID is 203.

FIG. 13 is a view depicting an example of a configuration of a geographic cluster deployment information management table.

Referring to FIG. 13, the geographic cluster deployment management table T110 retains coordinates and a magnitude of each geographic cluster when the entire IT system is mapped to a topology. The geographic cluster deployment management table T110 includes information of a cluster name T1101, an X coordinate T1102, a Y coordinate T1103, a height T1104 and a width T1105. The value of each coordinate is a value of a coordinate system in which the left upper apex of the topology map is the origin and the X coordinate increases in the leftward direction while the Y coordinate increases in the downward direction. The unit of the values is not restricted. The unit may be a pixel or millimeter.

Figure 14:
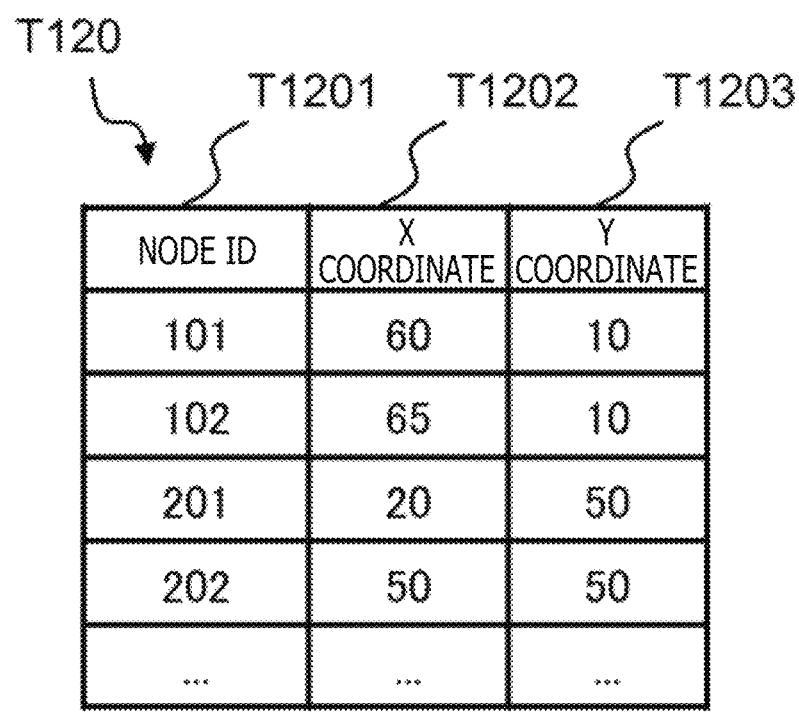
FIG. 14 is a diagram depicting an example of a configuration of a node deployment management table of FIG. 3.

FIG. 14 is a view depicting an example of a configuration of a node deployment management table of FIG. 3.

Referring to FIG. 14, the node deployment management table T120 retains coordinates of each node when the entire IT system is mapped to the topology. The node deployment management table T120 includes information of a node ID T1201, an X coordinate T1202 and a Y coordinate T1203. The coordinate system and the unit are similar to those of the geographic cluster deployment management table T110 of FIG. 13.

Figure 15:
FIG. 15 is a diagram depicting an example of a configuration of an infrastructure importance degree management table of FIG. 3.

FIG. 15 is a view depicting an example of a configuration of an infrastructure importance degree management table of FIG. 3.

Referring to FIG. 15, the infrastructure importance degree management table T130 retains a degree of importance of each infrastructure resource to each application. Here, the degree of importance is a value indicative of a degree of possibility that attention may be paid preferentially within the topology map because of such a state where a problem occurs when the user displays the topology map.

The infrastructure importance degree management table T130 includes information of a node ID T1301, a related node ID T1302, response time 1303, a cost T1304 and a degree of importance T1305. The node ID T1301 is an ID of an application node, and the related node ID T1302 is an ID of an infrastructure node related to the node ID T1301. It is to be noted that, in the present embodiment, in the infrastructure importance degree management table T130, an ID of a VM node related directly to an application node is placed.

The response time 1303 is response time of storage access to a related node. The response time 1303 indicates a state of a resource from a perspective of a performance, and as the response time 1303 increases, the possibility that the resource may suffer from a performance problem increases and the resource is likely to be noticed. The cost T1304 is a cost paid to the related node by the user. In the present embodiment, the cost T1304 indicates an expense for a VM and a volume. It is considered that, as the cost becomes higher, the resource is used in an application that is more important to the user. The degree of importance T1305 is a degree of possibility that the user may pay attention to the resource with higher priority in the topology map and is calculated, for example, from the state of the resource and the cost of the resource.

FIG. 16 is a view depicting an example of a configuration of an application importance degree management table of FIG. 3.

Referring to FIG. 16, the application importance degree management table T140 retains a degree of importance of applications. The application importance degree management table T140 includes information of a node ID T1401, a cost T1402, a degree of importance T1403, a country T1404 and a data center T1405.

The node ID T1401 is an ID of an application node. The cost T1402 is a total cost of infrastructure resources to which the application is related and is retained for each data center T1405. The degree of importance T1403 is a value that increases as the value of the cost T1402 increases. This depends upon the assumption that an application that costs more is more important to the user.

Further, because it is considered that the reason why an application distributes used resources to data centers is to secure a response performance to an access from each region or to improve the usability of disaster recovery (DR) or the like, to the application, there is a dispersion in degree of importance of the resources of the data centers. Therefore, since it is considered that, even from the infrastructure perspective, the degree of importance of the applications differs for each data center, the degree of importance T1403 is calculated for each data center.

Figure 17:
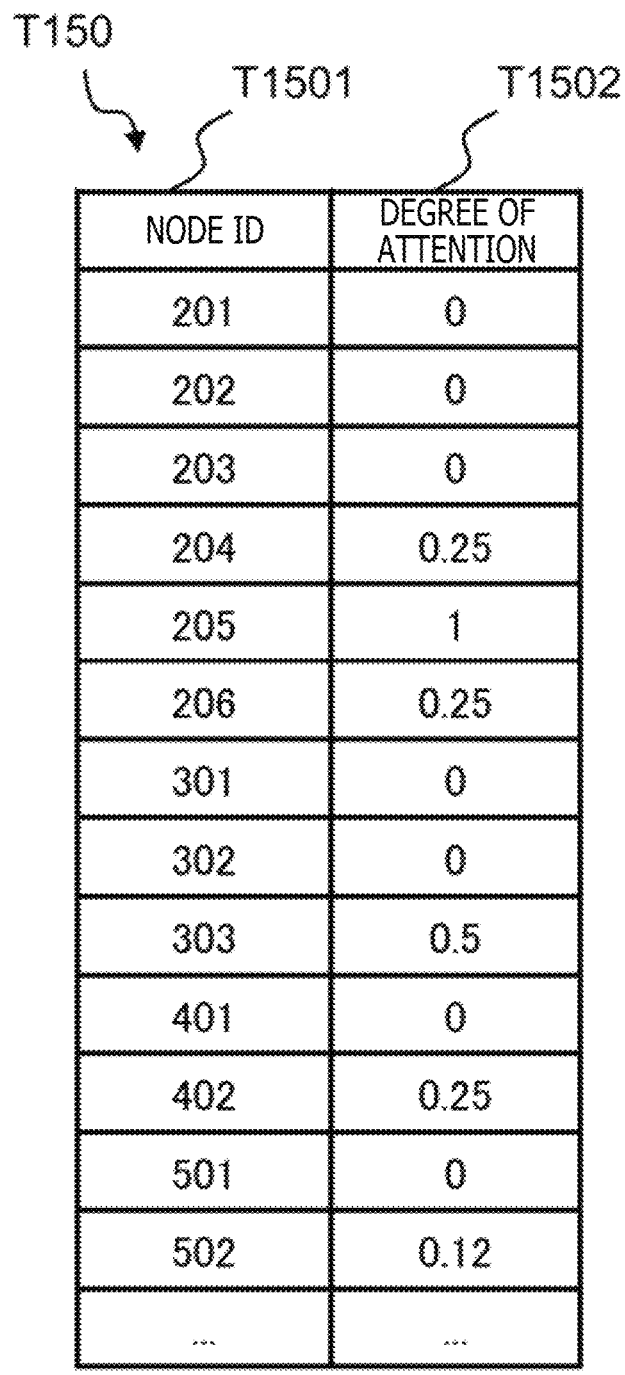
FIG. 17 is a diagram depicting an example of a configuration of a degree-of-attention management table of FIG. 3.

FIG. 17 is a view depicting an example of a configuration of a degree-of-attention management table of FIG. 3.

Referring to FIG. 17, the degree-of-attention management table T150 indicates a distance from a location to which the user pays attention in the topology map. The degree-of-attention management table T150 includes information of a node ID T1501 and a degree of attention T1502.

The client 100 of FIG. 3 calculates a degree of attention on the basis of a node selection operation of the user. When the user selects a node, the client 100 registers the value of 1 into the degree of attention T1502 of the selected node and registers, for the other nodes, a value obtained by attenuating the value by a hop number to the selected node. For example, when a link extends directly from the selected node, for a node that requires one hop to reach, the value of 0.5 is registered, and for a node that requires two hops to reach, the value of 0.25 is registered.

FIG. 18 is a view depicting an example of a configuration of topology data of FIG. 3.

Referring to FIG. 18, the topology data T100 is described, for example, in the form of JavaScript (registered trademark) object notation (JSON). The topology data T100 includes at least a node data T1010 and link data T1020.

The node data T1010 is equivalent to data included in the node data management table T270 of FIG. 11 and includes, for example, a node name and RAG of a state. Further, the link data T1020 is equivalent to data included in the link data management table T280 of FIG. 12.

Figure 19:
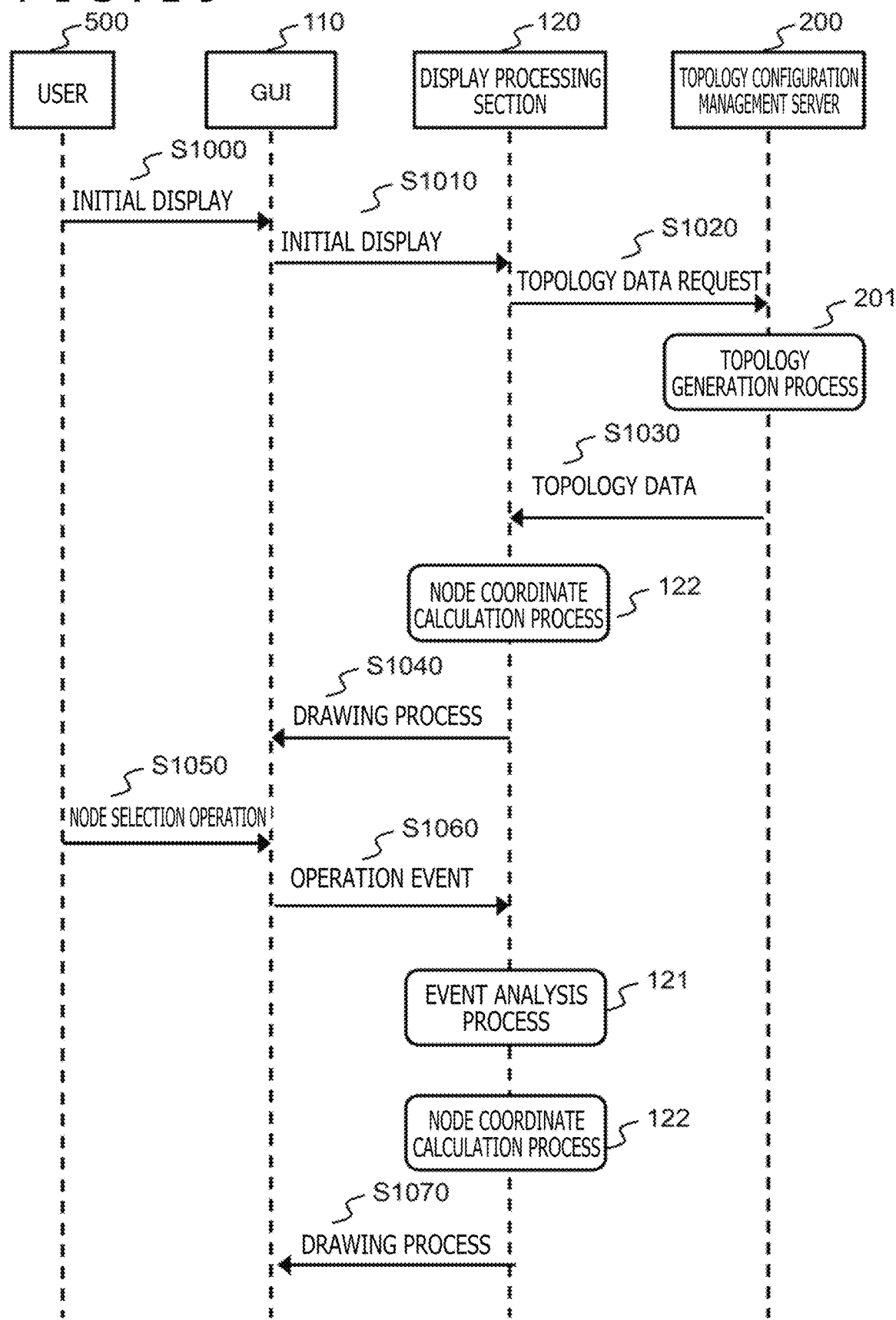
FIG. 19 is a sequence diagram depicting an outline of a drawing process of a topology map.

FIG. 19 is a sequence diagram depicting an outline of a drawing process of a topology map.

Referring to FIGS. 19, S1000 to S1040 depict a flow of processing until the initial screen image 130A of FIG. 1 is displayed on the GUI 110, and S1050 to S1070 depict a flow of processing until the changed screen image 130B of FIG. 1 is displayed on the GUI 110.

If a user 500 issues an instruction to initially display a topology map to the GUI 110 (S1000), then the GUI 110 issues an initial display request for a topology map to the display processing unit 120 of FIG. 3 (S1010). The display processing unit 120 requests topology data to the topology configuration management server 200 in response to the initial display request (S1020). When the topology configuration management server 200 receives the acquisition request for topology data, it executes the topology generation process 201 to generate topology data. Then, the topology configuration management server 200 transmits the generated topology data to the display processing unit 120 (S1030).

The display processing unit 120 executes the node coordinate calculation process 122 in regard to the received topology data to perform a drawing process of the GUI 110 (S1040).

Then, if the user 500 performs a node selection operation (S1050), then the GUI 110 specifies a target node for which the operation has been performed and notifies the display processing unit 120 of occurrence of an operation event (S1060).

When the display processing unit 120 receives the notification of the operation event occurrence, it executes the event analysis process 121 and updates the degree of attention of each node. Then, the display processing unit 120 executes the node coordinate calculation process 122, re-calculates the degree of importance of the infrastructure resource on the basis of the updated degree of attention, and re-calculates the coordinates of the node on the basis of the re-calculated degree of importance of the infrastructure resource.

Then, the display processing unit 120 notifies the GUI 110 of the re-calculated coordinates of the node, and the GUI 110 updates the topology map on the basis of the re-calculated coordinates of the node (S1070).

Figure 20:
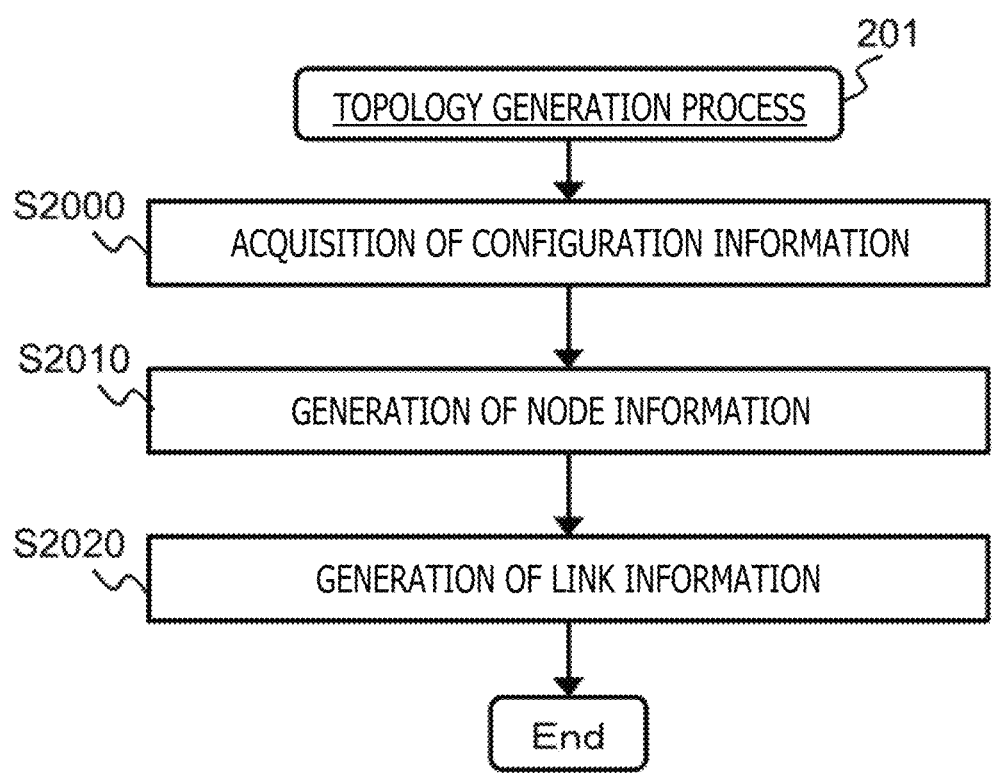
FIG. 20 is a flow chart illustrating a topology production process of FIG. 3.

FIG. 20 is a flow chart depicting a topology generation process of FIG. 3.

Referring to FIG. 20, the topology generation process 201 refers to the configuration management tables T200 to T250 of FIG. 3 to collect various kinds of configuration information regarding the IT system 300 (S2000). It is sufficient only if the topology generation process 201 acquires such configuration information from the IT system 300 at optional timings, for example, at time determined in advance. Further, the topology generation process 201 refers to management software and so forth of the IT system 300 or the like to collect state information about the resources.

Then, the topology generation process 201 generates, on the basis of the configuration information and the state information, node information regarding the infrastructure resources and applications used in the IT system 300 and updates the node data management table T270 with the node information (S2010).

Then, the topology generation process 201 generates link information about the connection between the nodes on the basis of the configuration information and updates the link data management table T280 with the link information (S2020). The topology generation process 201 generates topology data T100 on the basis of the values of the node data management table T270 updated in S2010 and the link data management table T280 updated in S2020 and then ends the processing.

Figure 21:
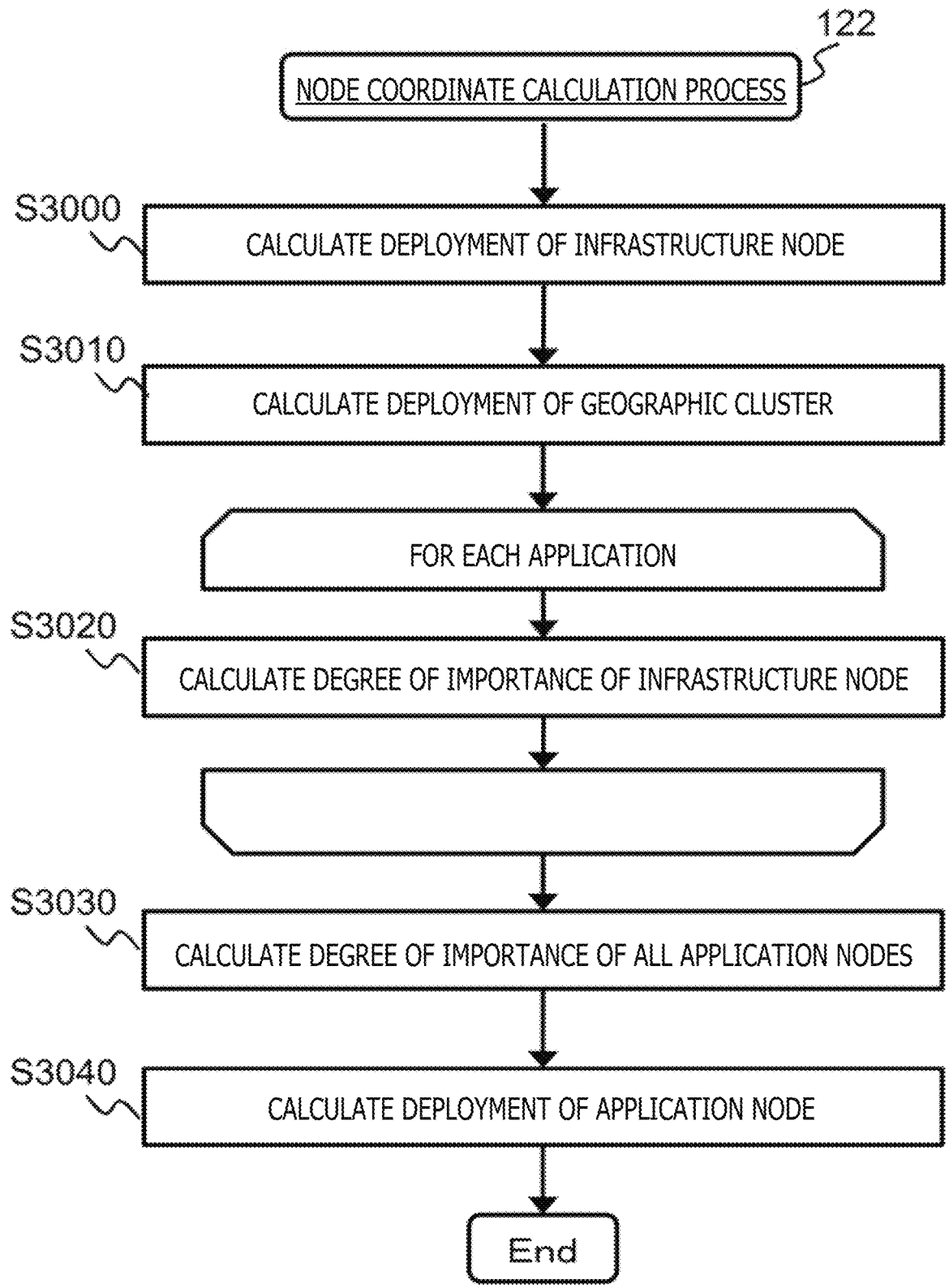
FIG. 21 is a flow chart depicting a node coordinate calculation process of FIG. 3.

FIG. 21 is a flow chart depicting a node coordinate calculation process of FIG. 3.

Referring to FIG. 21, the node coordinate calculation process 122 refers to the topology data T100 to calculate coordinates of the infrastructure nodes (T3000). As depicted in FIG. 2, in the present embodiment, infrastructure nodes are put together in a unit of a geographic cluster, and each infrastructure node is displayed in the inside of a geographic cluster drawn as a rectangle. It is to be noted that, in the present embodiment, the order on a screen image in which the geographic clusters are displayed is, for example, an alphabetical order.

In the calculation of a coordinate of an infrastructure node, the node coordinate calculation process 122 can use a graph drawing algorithm. The graph drawing algorithm is, for example, the Sugiyama Framework. The node coordinate calculation process 122 deploys geographic nodes such that infrastructure nodes belonging to different geographic clusters may not mix so as to prevent overlapping of display regions of the geographic clusters. To this end, the node coordinate calculation process 122 calculates coordinates of the infrastructure nodes for each geographic cluster and combines topologies in individually calculated geographic cluster units to generate a topology map of the entire topologies.

Then, the node coordinate calculation process 122 calculates coordinates and a size of each geographic cluster as a rectangle in which infrastructure nodes are included (S3010).

Then, in order to calculate deployment of application nodes, the node coordinate calculation process 122 estimates the degree of importance of each infrastructure resource and each application. In particular, the display processing unit 120 calculates, for each application, the degree of importance of each infrastructure resource to which the application is related (S3020).

The degree of importance of an infrastructure resource is calculated, for example, from a state, a cost and a degree of attention of the resource. The metric for quantitatively evaluating a state of a resource differs for each value designated by the Feature selector 150. For example, the "Performance" is a daily average of response time to a storage access indicative of a state of a performance. The cost is, for example, a daily average or the like of the cost consumed by the resource. The degree of attention is a value placed in the degree-of-attention management table T150.

For calculation of the degree of importance of an infrastructure resource, a deviation value is used, for example. At this time, a deviation value is calculated in regard to the metric of each of a state and a cost of the resource, and the product of the sum of such deviation values and the degree of attention is determined as the degree of importance of the node to which the infrastructure resource is allocated. The node coordinate calculation process 122 places results of the calculation of the degree of importance of the infrastructure node into the infrastructure importance degree management table T130.

Then, the node coordinate calculation process 122 determines the degree of importance of each application (S3030). In regard to the degree of importance of an application, for each geographic cluster, the total cost of infrastructure resources to which the application is related is calculated, and this is used as the metric. For calculation of the degree of importance of an application, a deviation value can be used similarly as in the process in S3020, for example. The node coordinate calculation process 122 places results of the calculation of the degree of importance of the applications into the application importance degree management table T140.

Then, the node coordinate calculation process 122 calculates coordinates of the application nodes using the results of calculation calculated in S3020 and S3030 (S3040). In the calculation of coordinates of an application node based on the topology data T100, a graph drawing algorithm such as the Sugiyama Framework can be used.

Further, the node coordinate calculation process 122 changes the coordinates of application nodes by changing the degree of importance of the nodes and the links. For example, the node coordinate calculation process 122 multiplies the length of a link between an application node and an infrastructure node by the reciprocal of the degree of importance of the infrastructure resource calculated in S3020 to calculate coordinates of the application nodes, with which they are generally balanced, such that each application node is deployed nearer to a comparatively important infrastructure node. Further, for example, the node coordinate calculation process 122 calculates coordinates of an application node on the basis of the degree of importance of the application of the nearest geographic cluster. At this time, the node coordinate calculation process 122 changes the X coordinate of the application node while it fixes the Y coordinate of the application node as an application layer.

Further, the node coordinate calculation process 122 performs ranking of the applications by magnitude of the degrees of importance of the applications calculated in S3030 such that the application nodes do not excessively overcrowd and a comparatively important application node is deployed near to an infrastructure node. Then, the node coordinate calculation process 122 deploys the application nodes in a spaced relationship by a fixed distance or more in a descending order of the ranks from an application node near to the infrastructure node. Consequently, the node coordinate calculation process 122 can generate a topology map in which an infrastructure resource that is inferior in state or is high in cost is deployed nearer to an application node.

Figure 22:
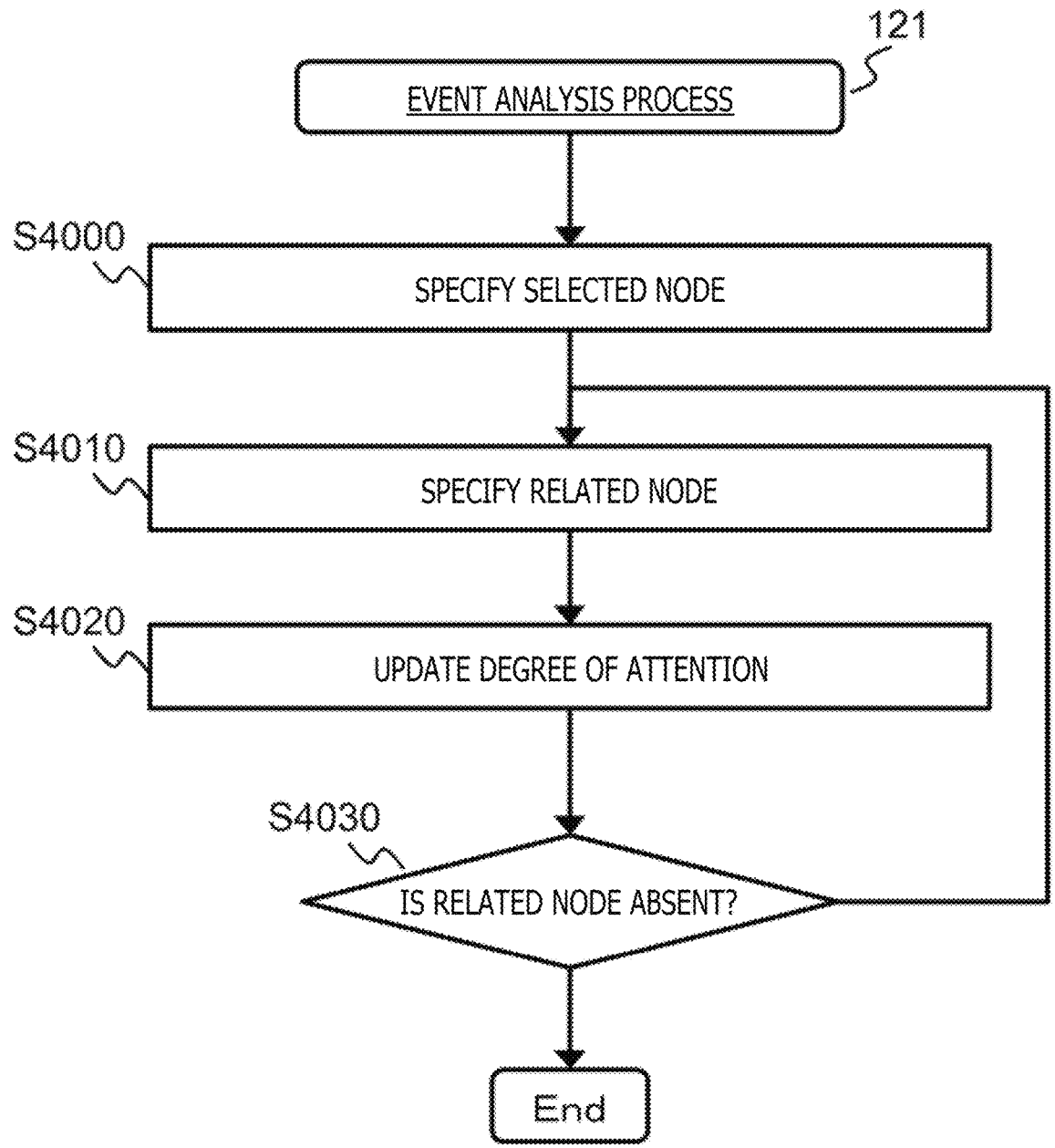
FIG. 22 is a flow chart illustrating an event analysis process of FIG. 3.

FIG. 22 is a flow chart depicting an event analysis process of FIG. 3.

Referring to FIG. 22, after the event analysis process 121 specifies a node selected by the user (S4000), it specifies a node group from which a link is connected to the node (S4010).

Then, the event analysis process 121 sets the degree of attention of the node selected first by the user to 1 and successively halves the value from 1 on the basis of a hop number of links when following from the node to a related node and sets the halved value as a degree of attention (S4020). For example, the degree of attention of a related node that can be followed by one step is 0.5, and the degree of attention of a related node that can be followed by two steps is 0.25.

The event analysis process 121 repeats the processes in S4010 and S4020 for each node until a related node cannot be followed any more (S4030). The event analysis process 121 updates the degree-of-attention management table T150 on the basis of the degrees of attention calculated by the processes described above.

Embodiment 2

The following second embodiment described below is directed to a case in which the node coordinate calculation process 122 of FIG. 3 cannot acquire information relating to a cost, namely, information retained in the catalog management table T260. At this time, the node coordinate calculation process 122 does not use information about the cost but uses configuration information about infrastructure resources and state information about the occupancy rate or the like to calculate a degree of infrastructure importance and a degree of importance of application.

The configuration of the computer system according to the second embodiment is similar to that in the first embodiment, and therefore, illustration of the configuration is omitted. In the communication system according to the second embodiment, in the node data management table T270, also information about an allocated memory amount to a VM, an allocated CPU number and a device kind is set further. Further, although, in the first embodiment, the node coordinate calculation process 122 calculates a degree of importance on the basis of a cost in the processes in S3020 and S3030 of FIG. 21, in the second embodiment, the degree of importance is calculated on the basis of a resource amount indicative of a scale of an infrastructure resource. For example, in the case of a VM, the resource amount is a memory amount, a CPU number and a disk capacity. The degree of importance of an application is calculated on the basis of an allocation amount of at least part of infrastructure resources relating to the application.

In the following, a calculation method is described taking that of a VM as an example. In particular, in the process of S3020, the node coordinate calculation process 122 calculates a deviation value of an allocation amount for each resource in place of a deviation of a cost and calculates an average of the deviation values of the resources. Also in the process of S3030, the node coordinate calculation process 122 uses an average value of deviation values of allocated resources in place of a deviation value of the cost.

This makes it possible for the node coordinate calculation process 122 to estimate a degree of importance of infrastructure resources and a degree of importance of applications without converting an allocated resource amount into a cost.

Embodiment 3

The third embodiment described below is directed to a case in which the node coordinate calculation process 122 of FIG. 3 cannot acquire information relating to a cost, namely, information retained in the catalog management table T260 and information relating to a state. At this time, the node coordinate calculation process 122 uses configuration information about infrastructure resources to calculate a degree of importance of an infrastructure and a degree of importance of an application.

Figure 23:
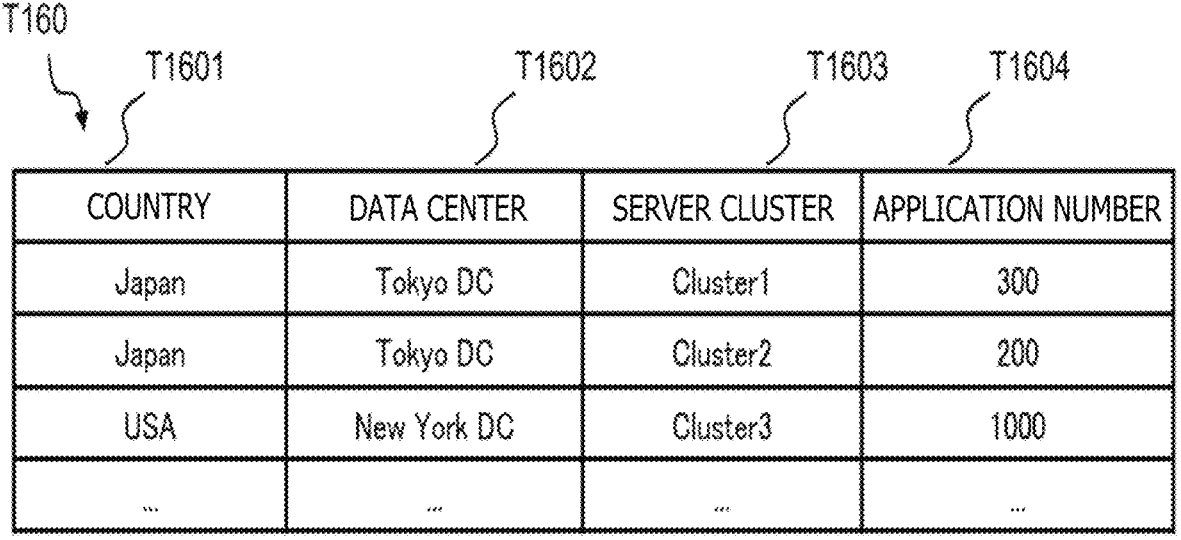
FIG. 23 is a diagram depicting an example of configuration information to be used in a display information processing apparatus according to a third embodiment.

FIG. 23 is a view depicting configuration information used in the information processing apparatus according to the third embodiment.

Referring to FIG. 23, in the configuration of the computer system according to the third embodiment, the display processing unit 120 of FIG. 3 includes an application allocation number management table T160 in addition to the components depicted in FIG. 3.

The application allocation number management table T160 retains, for each of countries, data centers and server clusters, the number of applications that use infrastructure resources included in the geographic cluster. The information retained by the application allocation number management table T160 indicates a degree of one-sidedness of applications to geographic clusters. In the case where the reason why an application uses resources of a plurality of regions is improvement in response performance or load distribution, it is considered that the possibility that a region to which a comparatively great number of applications are deployed one-sidedly is a region that is high in importance on business.

In the third embodiment, the node coordinate calculation process 122 refers to the application allocation number management table T160 to calculate a degree of importance of an infrastructure on the basis of the number of applications that utilize infrastructure resources. In particular, in the process in S3020 of FIG. 21, the node coordinate calculation process 122 extracts an application number from the application allocation number management table T160 in regard to a country to which infrastructures of a calculation target belong, a geographic cluster of a data center and server clusters that are passed at the time of following from an application to an infrastructure resource and totals such application numbers. The node coordinate calculation process 122 calculates the total value for each infrastructure resource, calculates a deviation value of the total value and uses the deviation value as the degree of importance of the infrastructure.

Figure 24:
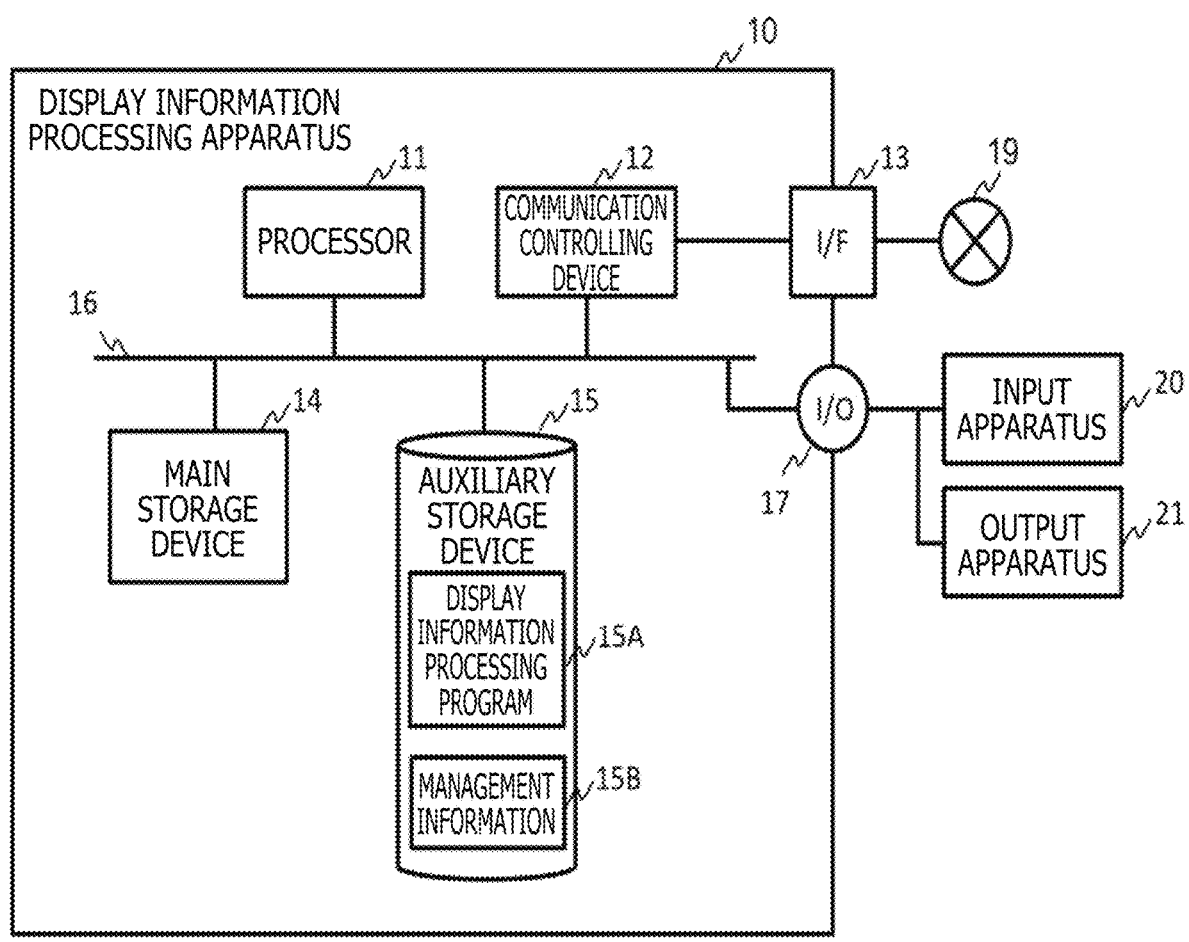
FIG. 24 is a block diagram depicting an example of a hardware configuration of the display information processing apparatus of FIG. 3.

FIG. 24 is a block diagram depicting an example of a hardware configuration of the display information processing apparatus of FIG. 3.

Referring to FIG. 24, the display information processing apparatus 10 can be used as the client 100 of FIG. 1. The display information processing apparatus 10 includes a processor 11, a communication controlling device 12, a communication interface 13, a main storage device 14, an auxiliary storage device 15 and an input/output interface 17. The processor 11, communication controlling device 12, communication interface 13, main storage device 14, auxiliary storage device 15 and input/output interface 17 are connected to each other through an internal bus 16. The main storage device 14 and the auxiliary storage device 15 can be accessed from the processor 11.

The display information processing apparatus 10 has an inputting apparatus 20 and an outputting apparatus 21 provided therein. The inputting apparatus 20 and the outputting apparatus 21 are connected to the internal bus 16 through an input/output interface 17. The inputting apparatus 20 includes a keyboard, a mouse, a touch panel, a card reader, a sound inputting device or the like. The outputting apparatus 21 is a screen image displaying device (a liquid crystal monitor, an organic electro luminescence (EL) display, a graphic card and so forth), a sound outputting device (speaker and so forth), a printing device and so forth.

The processor 11 is hardware responsible for control of operation of the entire display information processing apparatus 10. The processor 11 may be a central processing unit (CPU) or may be a graphics processing unit (GPU). The processor 11 may be a single core processor or may be a multi core processor. The processor 11 may include a hardware circuit that performs part or all of processing (for example, a field-programmable gate array (FPGA) or an application specific integrated circuit (ASIC)). The processor 11 may include a neural network.

The main storage device 14 can be configured from a semiconductor memory such as, for example, a static random access memory (SRAM) or a dynamic random access memory (DRAM). The main storage device 14 allows storage of a program being executed by the processor 11 and allows provision of a work area for allowing the processor 11 to execute a program.

The auxiliary storage device 15 is a storage device having a large storage capacity and is, for example, a hard disk device or a solid state drive (SSD). The auxiliary storage device 15 can retain execution files of various programs and data to be used for execution of the programs. Into the auxiliary storage device 15, a display information processing program 15A and management information 15B can be stored. The display information processing program 15A may be software that can be installed into the display information processing apparatus 10 or may be incorporated as firmware in the display information processing apparatus 10 in advance. The management information 15B is data used in processing of the display information processing program 15A and is various tables retained by the client 100 of FIG. 3.

The communication controlling device 12 is hardware having a function for controlling communication with the outside. The communication controlling device 12 is connected to a network 19 through the communication interface 13. The network 19 may be a wide area network (WAN) such as the Internet, or may be a local area network (LAN) such as WiFi or the Ethernet (registered trademark) or else may include both of a WAN and a LAN.

The input/output interface 17 converts data inputted from the inputting apparatus 20 into data of a data format that can be processed by the processor 11 and converts data outputted from the processor 11 into data of a data format that can be processed by the outputting apparatus 21.

The processor 11 reads out the display information processing program 15A into the main storage device 14 and executes the display information processing program 15A. This makes it possible to set an index relating to relevance between entities to which nodes configuring a topology are allocated, find the distance between the nodes on the basis of the index and set display positions of the nodes on the basis of the distance between the nodes.

It is to be noted that the execution of the display information processing program 15A may be shared by a plurality of processors or computers. Alternatively, the processor 11 may instruct a cloud computer or the like through the network 19 to execute all or part of the display information processing program 15A and receive a result of the execution.

It is to be noted that the first, second and third embodiments described above may be used in combination. For example, if the first embodiment and the third embodiment are applied simultaneously such that information of the infrastructure side in regard to the cost and the state information and information of the business side in regard to one-sided in application allocation are used, more multilateral analysis becomes possible.

It is to be noted that, although the embodiments described above are directed to a method that uses, in order to calculate the degree of importance of an infrastructure resource, at least one of a configuration of the infrastructure resource, a state of the infrastructure resource, a cost of the infrastructure resource, an allocation amount of the infrastructure resource, a degree of attention to the infrastructure resource and an allocation number of applications to the infrastructure resource, some other information about a number of times of accessing to the infrastructure resource, for example, may be used instead. Further, in order to calculate the degree of importance of an application, some other information about a number of times of starting of the application, for example, may be used.

It is to be noted that the present invention is not limited to the embodiments described above and includes various modifications. For example, the embodiments described above are described in detail in order to explain the present invention clearly and the present invention is not necessarily restricted to embodiments that include all configurations described hereinabove. Further, it is possible to replace part of the configuration of a certain embodiment with the configuration of a different embodiment and also it is possible to add, to the configuration of a certain embodiment, the configuration of a different embodiment. Further, part of the configuration of each embodiment may be subject to addition, deletion or replacement of a different configuration. Further, the configurations, functions, processing sections, processing means and so forth of the configurations described above may be implemented partly or entirely by hardware, for example, by designing them in the form of an integrated circuit.

What is claimed is:

1. A display information processing apparatus for
a memory;
an input/output device;
a processor communicatively coupled to the memory and the input/output device, the processor configured to
place a plurality of infrastructure nodes into a plurality of units, such that each of the plurality of units contains a different set of the plurality of infrastructure nodes,
calculate coordinates and size of each of the plurality of units,
calculate, for each of the plurality of units, a degree of importance for the plurality of infrastructure nodes based on a degree of attention of the resource according to a feature selected by a user,
calculate a degree of importance for each of a plurality of applications,
set an index relating to relevancy between entities to which the plurality of units configuring a topology are allocated,
determine a distance between each of the plurality of applications on a basis of the index,
change the coordinates of each of the plurality of applications based on the degree of importance of the plurality of infrastructure nodes,
perform ranking of the plurality of units by magnitude of the degree of importance for each of the plurality of applications, such that the plurality of applications are not overcrowded, and
set a display position of each of the plurality of applications on a basis of the ranking.

2. The display information processing apparatus according to claim 1, wherein
the display positions of the plurality of applications are set hierarchically on a basis of kinds of the entities to which the plurality of applications are allocated.

3. The display information processing apparatus according to claim 2, wherein
display positions of the plurality of applications in a same hierarchy are set on a same line, and
display positions of the plurality of applications of different hierarchies are set on lines different from each other.

4. The display information processing apparatus according to claim 1, wherein, the entities are an infrastructure resource and an application used in an IT system.

5. The display information processing apparatus according to claim 4, wherein,
the index is selected from at least one of the degree of importance of the plurality of infrastructure nodes and the degree of importance of each of the plurality of applications,
the degree of importance of the plurality of infrastructure nodes is calculated on a basis of at least one of a configuration of an infrastructure resource, a state of the infrastructure resource, a cost of the infrastructure resource, an allocation amount of the infrastructure resource, a degree of attention to the infrastructure resource and an allocation number of each application to the infrastructure resource, and the degree of importance of each of the plurality of nodes is calculated on a basis of at least one of a cost of the application and an allocation amount of the infrastructure resource to which the plurality of applications are related.

6. The display information processing apparatus according to claim 5, wherein
the distance between a node of one of the plurality of applications and one of the plurality of infrastructure nodes is weighted with a reciprocal of the degree of importance of the infrastructure nodes to determine deployment of the node one of the plurality of applications.

7. The display information processing apparatus according to claim 5, wherein
the degree of importance of each of the plurality of applications is calculated on a basis of total values of each cost of each infrastructure resource to which each of the plurality of applications is related, and where nodes of the plurality of applications are deployed adjacent the node of the infrastructure resource, the display positions of the nodes of each of the plurality of applications are set such that a node of one of the plurality of applications whose degree of importance is higher is positioned closer to one of the plurality of infrastructure nodes with a comparative degree of importance.

8. The display information processing apparatus according to claim 5, wherein
the infrastructure resource is a virtual machine (VM) and state information of the infrastructure resource is response time upon storage accessing.

9. The display information processing apparatus according to claim 5, wherein
the plurality of infrastructure nodes are displayed in a form grouped in one of the plurality of units of a geographic cluster,
the degree of importance each of the applications are calculated in one of the plurality of units of the geographic cluster, and
the display position of the node of the plurality of applications are set on a basis of the degree of importance of the application of a closest geographic cluster.

10. The display information processing apparatus according to claim 9, wherein
the geographic cluster is displayed as a rectangle at a position that does not include the node of one of the plurality of applications but includes the node of the infrastructure resource in an overlapping relationship on a topology map.

11. The display information processing apparatus according to claim 10, wherein
the geographic cluster and the node of one of the plurality of applications and link that configure the topology are scaled in response to a zoom operation, and a detailed configuration of display of the geographic cluster and the node of one of the plurality of applications and the link that configure the topology is set in response to a degree of the zoom.

12. The display information processing apparatus according to claim 11, wherein
a degree of attention of each infrastructure resource is calculated on a basis of a selection operation for the plurality of infrastructure nodes, the degree of importance of the plurality of infrastructure nodes is recalculated such that the degree of importance of the plurality of infrastructure nodes whose degree of attention is high becomes higher, and the display position of the node of the application is re-set on a basis of the re-calculated degree of importance of the plurality of infrastructure nodes.

13. The display information processing apparatus according to claim 5, wherein the degree of importance of each of the plurality of infrastructure nodes is calculated on a basis of the number of applications allocated to the infrastructure resource, and the display position of each of the nodes of the applications is set such that the node of the application comes closer to the node of the infrastructure resource to which the allocated number of the applications is greater.

* * * * *